(12) United States Patent
DeJonge et al.

(10) Patent No.: US 10,251,231 B1
(45) Date of Patent: Apr. 2, 2019

(54) LOAD CONTROL DEVICE HAVING A WIDE OUTPUT RANGE

(71) Applicant: Lutron Electronics Co., Inc., Coopersburg, PA (US)

(72) Inventors: Stuart W. DeJonge, Riegelsville, PA (US); Steven J. Kober, Center Valley, PA (US); Mark S. Taipale, Harleysville, PA (US)

(73) Assignee: LUTRON ELECTRONICS CO., INC., Coopersburg, PA (US)

( * ) Notice: Subject to any disclaimer, the term of this patent is extended or adjusted under 35 U.S.C. 154(b) by 0 days.

(21) Appl. No.: 15/903,989

(22) Filed: Feb. 23, 2018

Related U.S. Application Data

(60) Provisional application No. 62/562,066, filed on Sep. 22, 2017, provisional application No. 62/580,707, filed on Nov. 2, 2017.

(51) Int. Cl.
  *G05F 1/00* (2006.01)
  *H05B 33/08* (2006.01)
  *H05B 37/02* (2006.01)

(52) U.S. Cl.
  CPC ....... *H05B 33/0851* (2013.01); *H05B 33/089* (2013.01); *H05B 33/0815* (2013.01); *H05B 33/0824* (2013.01); *H05B 37/029* (2013.01)

(58) Field of Classification Search
  CPC .. H05B 41/28; H05B 41/295; H05B 41/2827; H05B 41/3925; H05B 41/34; H05B 33/0803; H05B 39/09; H05B 33/0809; H05B 33/0815; H05B 33/0818; H05B 41/2828; H05B 41/3921; H05B 41/3927; H05B 37/029; H05B 37/0254; H05B 37/02; Y02B 20/202
  See application file for complete search history.

(56) References Cited

U.S. PATENT DOCUMENTS

| 8,466,628 B2 | 6/2013 | Shearer et al. |
| 8,492,987 B2 | 7/2013 | Nuhfer et al. |
| 9,247,608 B2 | 1/2016 | Chitta et al. |

(Continued)

FOREIGN PATENT DOCUMENTS

| DE | 102016100710 A1 | 1/2016 |
| EP | 1689212 A1 | 8/2006 |

(Continued)

*Primary Examiner* — Minh D A
(74) *Attorney, Agent, or Firm* — Condo Roccia Koptiw LLP

(57) ABSTRACT

A load control device (e.g., an LED driver) for controlling the intensity of a lighting load (e.g., an LED light source) may provide a wide output range and flicker-free adjustment of the intensity of the lighting load. The load control device may comprise a load regulation circuit, a control circuit, and a filter circuit (e.g., a boxcar filter circuit) that operates in a different manner in dependence upon a target current. When the intensity of the lighting load is near a low-end intensity, the control circuit may adjust an operating frequency of the load regulation circuit in response to the target current, and may control the filter circuit to filter a current feedback signal during a filter window that repeats on periodic basis. When the intensity of the lighting load is near a high-end intensity, the control circuit may control the filter circuit to constantly filter the current feedback signal.

22 Claims, 6 Drawing Sheets

(56) References Cited

U.S. PATENT DOCUMENTS

| | | |
|---|---|---|
| 9,491,823 B2 | 11/2016 | Watanabe et al. |
| 9,655,177 B2 | 5/2017 | Veskovic |
| 2008/0252275 A1 | 10/2008 | Martin |
| 2011/0080110 A1 | 4/2011 | Nuhfer et al. |
| 2012/0153920 A1 | 6/2012 | Guenther et al. |
| 2013/0063047 A1 | 3/2013 | Veskovic |
| 2014/0009085 A1 | 1/2014 | Veskovic |
| 2014/0354170 A1* | 12/2014 | Gredler .............. H05B 33/0815 315/224 |
| 2015/0061521 A1 | 3/2015 | Cohen |
| 2015/0130372 A1 | 5/2015 | Chitta et al. |
| 2015/0318787 A1 | 11/2015 | Chitta et al. |
| 2016/0323953 A1* | 11/2016 | DeJonge ............ H05B 33/0848 |
| 2016/0374164 A1 | 12/2016 | Stevens, Jr. et al. |
| 2017/0188430 A1 | 6/2017 | Gredler et al. |
| 2018/0084616 A1 | 3/2018 | Kober |
| 2018/0249543 A1 | 8/2018 | Kober et al. |

FOREIGN PATENT DOCUMENTS

| | | |
|---|---|---|
| EP | 2214457 A1 | 8/2010 |
| WO | WO 0241483 A2 | 5/2002 |

\* cited by examiner

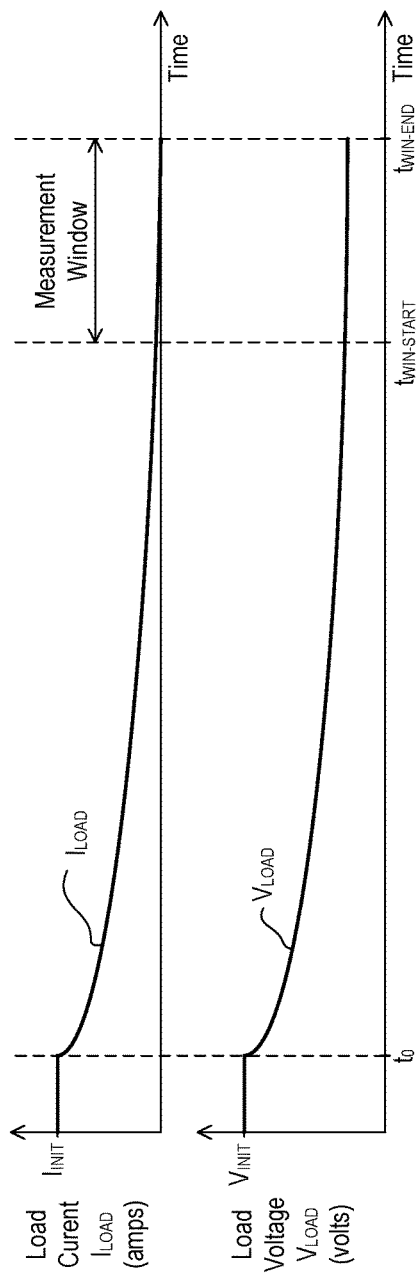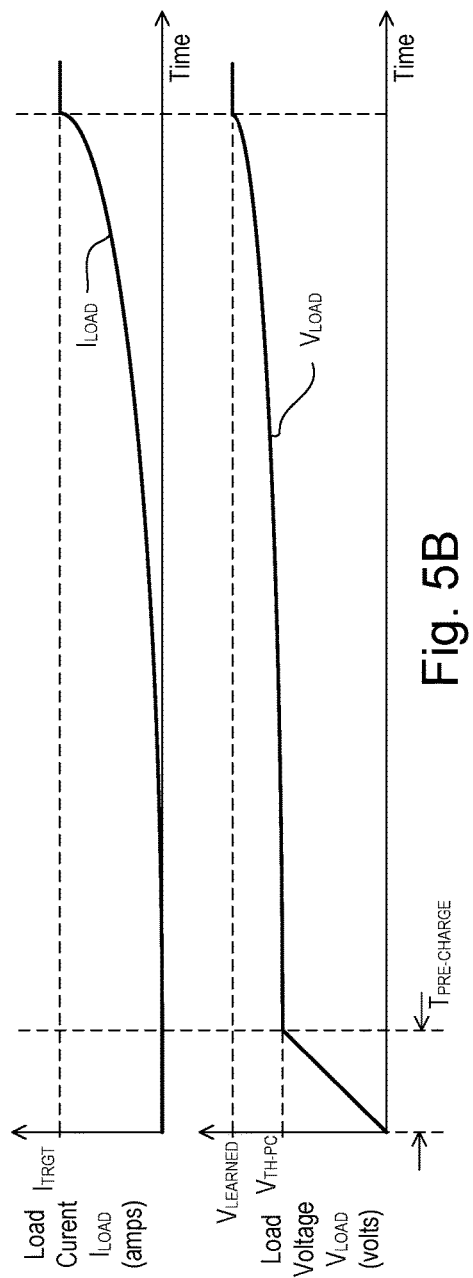

LOAD CONTROL DEVICE HAVING A WIDE OUTPUT RANGE

CROSS-REFERENCE TO RELATED APPLICATIONS

This application claims the benefit of U.S. Provisional Patent Application No. 62/562,066, filed Sep. 22, 2017, and U.S. Provisional Patent Application No. 62/580,707, filed Nov. 2, 2017, the entire disclosures of which are hereby incorporated by reference.

BACKGROUND OF THE INVENTION

Light-emitting diode (LED) light sources (e.g., LED light engines) are replacing conventional incandescent, fluorescent, and halogen lamps as a primary form of lighting devices. LED light sources may comprise a plurality of light-emitting diodes mounted on a single structure and provided in a suitable housing. LED light sources may be more efficient and provide longer operational lives as compared to incandescent, fluorescent, and halogen lamps. An LED driver control device (e.g., an LED driver) may be coupled between a power source, such as an alternating-current (AC) power source or a direct-current (DC) power source, and an LED light source for regulating the power supplied to the LED light source. For example, the LED driver may regulate the voltage provided to the LED light source, the current supplied to the LED light source, or both the current and voltage.

Different control techniques may be employed to drive LED light sources including, for example, a current load control technique and a voltage load control technique. An LED light source driven by the current load control technique may be characterized by a rated current (e.g., approximately 350 milliamps) to which the magnitude (e.g., peak or average magnitude) of the current through the LED light source may be regulated to ensure that the LED light source is illuminated to the appropriate intensity and/or color. An LED light source driven by the voltage load control technique may be characterized by a rated voltage (e.g., approximately 15 volts) to which the voltage across the LED light source may be regulated to ensure proper operation of the LED light source. If an LED light source rated for the voltage load control technique includes multiple parallel strings of LEDs, a current balance regulation element may be used to ensure that the parallel strings have the same impedance so that the same current is drawn in each of the parallel strings.

The light output of an LED light source may be dimmed. Methods for dimming an LED light source may include, for example, a pulse-width modulation (PWM) technique and a constant current reduction (CCR) technique. In pulse-width modulation dimming, a pulsed signal with a varying duty cycle may be supplied to the LED light source. For example, if the LED light source is being controlled using a current load control technique, the peak current supplied to the LED light source may be kept constant during an on-time of the duty cycle of the pulsed signal. The duty cycle of the pulsed signal may be varied, however, to vary the average current supplied to the LED light source, thereby changing the intensity of the light output of the LED light source. As another example, if the LED light source is being controlled using a voltage load control technique, the voltage supplied to the LED light source may be kept constant during the on-time of the duty cycle of the pulsed signal. The duty cycle of the load voltage may be varied, however, to adjust the intensity of the light output. Constant current reduction dimming may be used if an LED light source is being controlled using the current load control technique. In constant current reduction dimming, current may be continuously provided to the LED light source. The DC magnitude of the current provided to the LED light source, however, may be varied to adjust the intensity of the light output.

Examples of LED drivers are described in U.S. Pat. No. 8,492,987, issued Jul. 23, 2013, entitled LOAD CONTROL DEVICE FOR A LIGHT-EMITTING DIODE LIGHT SOURCE; U.S. Pat. No. 9,655,177, issued May 16, 2017, entitled FORWARD CONVERTER HAVING A PRIMARY-SIDE CURRENT SENSE CIRCUIT; and U.S. Pat. No. 9,247,608, issued Jan. 26, 2016, entitled LOAD CONTROL DEVICE FOR A LIGHT-EMITTING DIODE LIGHT SOURCE; the entire disclosures of which are hereby incorporated by reference.

SUMMARY OF THE INVENTION

As described herein, a load control device (e.g., an LED driver) for controlling the intensity of a lighting load (e.g., an LED light source) may provide a wide output range for current conducted through the lighting load to achieve flicker-free adjustment of the intensity of the lighting load. Since the load control device is characterized by a wide output range, the load control device may be able to control a large variety of different lighting loads having different ratings (e.g., different rated output currents and/or rated output voltages). This may allow a manufacturer of the load control device, a manufacturer of a fixture of the light source (such as an original equipment manufacturer (OEM)), and/or a distributer of the load control device and/or the fixture to maintain stock of a smaller number of stock keeping units (SKUs).

The load control device may comprise a load regulation circuit, a control circuit, and a filter circuit (e.g., such as a boxcar filter circuit) that operates in a different manner in dependence upon the intensity (e.g., a target intensity) of the load control device in order to provide the wide output range. The load regulation circuit may control the magnitude of a load current conducted through the lighting load to adjust the intensity of the lighting load between a low-end intensity and a high-end intensity. The filter circuit may receive a current feedback signal from the load regulation circuit and filter the current feedback signal to generate a filtered feedback signal. The control circuit may be operatively coupled to the load regulation circuit for controlling the magnitude of the load current towards a target current in response to the filtered feedback signal. When the intensity of the lighting load is near the low-end intensity (e.g., when the magnitude of the target current is less than a transition current), the control circuit may adjust an operating frequency of the load regulation circuit in response to the target current, and may control the filter circuit to filter the current feedback signal during a filter window that repeats on a periodic basis. When the intensity of the lighting load is near the high-end intensity (e.g., when the magnitude of the target current is greater than the transition current), the control circuit may control the filter circuit to constantly filter the current feedback signal. The control circuit may generate a filter control signal for controlling the filter circuit to filter the current feedback signal during the filter window when the magnitude of the target current is less than the transition current, and control the filter control signal to have a maximum duty cycle (e.g., 100%) when the magnitude of the target current is greater than the transition current.

BRIEF DESCRIPTION OF THE DRAWINGS

FIG. 5A shows example waveforms illustrating the operation of the LED driver of FIG. 2 when the LED driver is learning a load voltage.

FIG. 5B shows example waveforms illustrating the operation of the LED driver of FIG. 2 when the LED driver is turning on an LED light source using the learned load voltage.

DETAILED DESCRIPTION OF THE INVENTION

Figure 1:
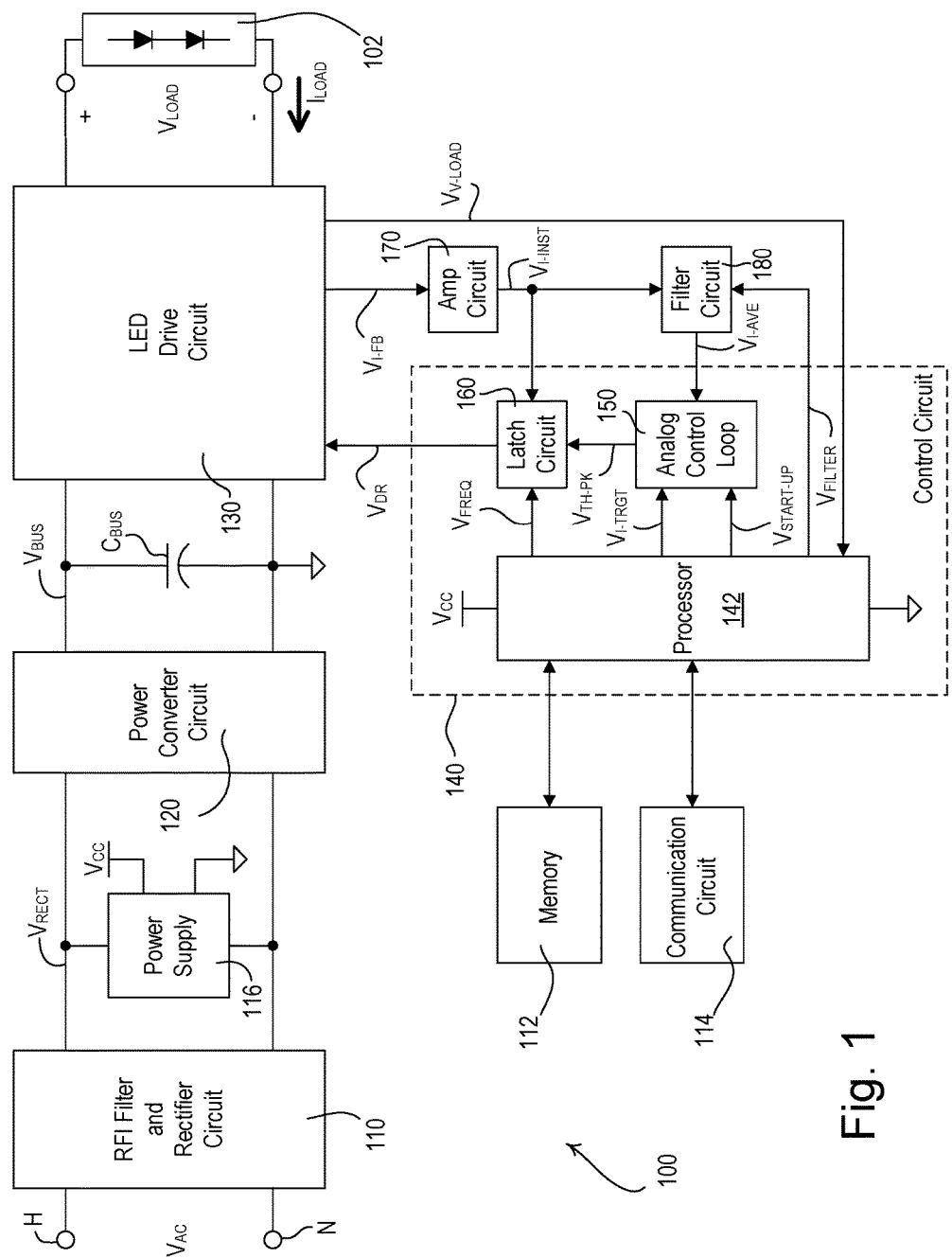
FIG. 1 is a simplified block diagram of an example light-emitting diode (LED) driver for controlling the intensity of an LED light source.

FIG. 1 is a simplified block diagram of a load control device, such as a light-emitting diode (LED) driver 100 for controlling the intensity of an LED light source 102 (e.g., an LED light engine). The LED light source 102 is shown in FIG. 1 as a plurality of LEDs connected in series but may comprise a single LED or a plurality of LEDs connected in parallel or a suitable combination thereof, depending on the particular lighting system. In addition, the LED light source 102 may alternatively comprise one or more organic light-emitting diodes (OLEDs). The LED driver 100 may be adapted to work with a plurality of different LED light sources, which may be rated at different magnitudes of load current and voltage.

The LED driver 100 may comprise a hot terminal H and a neutral terminal N for receiving an alternating-current (AC) voltage $V_{AC}$ from an AC power source (not shown). The LED driver 100 may comprise a radio-frequency (RFI) filter and rectifier circuit 110, which may receive the AC voltage $V_{AC}$. The RFI filter and rectifier circuit 110 may operate to minimize the noise provided on the AC power source and to generate a rectified voltage $V_{RECT}$. The LED driver 100 may comprise a power converter circuit 120, which may receive the rectified voltage $V_{RECT}$ and generate a variable direct-current (DC) bus voltage $V_{BUS}$ across a bus capacitor $C_{BUS}$. The power converter circuit 120 may comprise any suitable power converter circuit for generating an appropriate bus voltage, such as, for example, a boost converter, a buck converter, a buck-boost converter, a flyback converter, a single-ended primary-inductance converter (SEPIC), a Ćuk converter, or other suitable power converter circuit. The power converter circuit 120 may also provide electrical isolation between the AC power source and the LED light source 102, and operate as a power factor correction (PFC) circuit to adjust the power factor of the LED driver 100 towards a power factor of one.

The LED driver 100 may comprise a load regulation circuit, e.g., an LED drive circuit 130, which may receive the bus voltage $V_{BUS}$ and control the amount of power delivered to the LED light source 102 so as to control the intensity of the LED light source. For example, the LED drive circuit 130 may comprise a buck converter, as will be described in greater detail below. To control the amount of power delivered to the LED light source 102, the LED drive circuit 130 may be configured to control an average magnitude of a load current $I_{LOAD}$ conducted through the LED light source 102.

The LED driver 100 may include a control circuit 140 for controlling the operation of the power converter circuit 120 and the LED drive circuit 130. The control circuit 140 may comprise, for example, a controller or any other suitable processing device, such as, for example, a microcontroller, a programmable logic device (PLD), a microprocessor, an application specific integrated circuit (ASIC), or a field-programmable gate array (FPGA). The control circuit 140 may be configured to control the LED drive circuit 130 to control the average magnitude of the load current $I_{LOAD}$ conducted through the LED light source to control the amount of power delivered to the LED light source. The control circuit 140 may be configured to control the LED drive circuit 130 to turn the LED light source 102 on and off and to adjust (e.g., dim) a present intensity $L_{PRES}$ of the LED light source 102 towards a target intensity $L_{TRGT}$, which may range across a dimming range of the LED light source, e.g., between a low-end intensity $L_{LE}$ (e.g., approximately 0.1%-1.0%) and a high-end intensity $L_{HE}$ (e.g., approximately 100%).

The control circuit may be configured to fade (e.g., gradually adjust over a period of time) the target intensity $L_{TRGT}$ (and thus the present intensity $L_{PRES}$) of the LED light source 102. The control circuit 140 may be configured to fade the LED light source 102 from off to on by slowly increasing the present intensity $L_{PRES}$ of the LED light source from a minimum fading intensity $L_{FADE-MIN}$, which may be less than the low-end intensity $L_{LE}$ (e.g., such as approximately 0.02%), to the target intensity $L_{TRGT}$. The control circuit 140 may be configured to fade the LED light source 102 from on to off by slowly decreasing the present intensity $L_{PRES}$ of the LED light source from an initial intensity greater than or equal to the low-end intensity $L_{LE}$ to the minimum fading intensity $L_{FADE-MIN}$ at which point the control circuit 140 may turn off the LED light source.

The control circuit 140 may be coupled to a memory 112 configured to store operational characteristics of the LED driver 100 (e.g., the target intensity $L_{TRGT}$, the low-end intensity $L_{LE}$, the high-end intensity $L_{HE}$, etc.). The memory 112 may be implemented as an external integrated circuit (IC) or as an internal circuit of the control circuit 140. The LED driver 100 may also comprise a communication circuit 114, which may be coupled to, for example, a wired communication link or a wireless communication link, such as a radio-frequency (RF) communication link or an infrared (IR) communication link. The control circuit 140 may be configured to determine the target intensity $L_{TRGT}$ of the LED light source 102 or the operational characteristics stored in the memory 112 in response to digital messages received via the communication circuit 114. In response to receiving a command to turn on the LED light source 102, the control circuit 140 may be configured to execute the turn-on routine. The LED driver 100 may further comprise a power supply 116, which may receive the rectified voltage $V_{RECT}$ and generate a direct-current (DC) supply voltage $V_{CC}$ (e.g., approximately 5 volts) for powering the low-voltage circuitry of the LED driver. In addition, the power supply 116 may generate one or more additional supply voltages, for example, for powering control circuitry of the power converter circuit 120 and/or the LED drive circuit 130.

The control circuit 140 may comprise a digital control circuit, such as a processor 142, which may be, for example, a microprocessor, a programmable logic device (PLD), a microcontroller, an application specific integrated circuit (ASIC), a field-programmable gate array (FPGA), or other suitable processing device or controller. The control circuit 140 may also comprise an analog control loop circuit 150. The processor 142 and the analog control loop circuit 150 may operate together to control the LED driver circuit 130 to adjust the average magnitude of the load current $I_{LOAD}$ towards a target current $I_{TRGT}$. The target current $I_{TRGT}$ may be dependent upon the target intensity $L_{TRGT}$ (e.g., a function of the target intensity $L_{TRGT}$). The processor 142 may generate a target-current control signal $V_{I-TRGT}$, which may have a DC magnitude or a duty cycle that may indicate the target current $I_{TRGT}$. The processor 142 may control the DC magnitude or the duty cycle of the target-current control signal $V_{I-TRGT}$ based on the target intensity $L_{TRGT}$ of the LED light source 102.

The control circuit 140 may also comprise a latch circuit 160 that may generate a drive signal $V_{DR}$ for controlling the operation of the LED drive circuit 130 (e.g., for rendering a switching transistor of the LED drive circuit 130 conductive and non-conductive to regulate the average magnitude of the load current $I_{LOAD}$ towards the target current $I_{TRGT}$). The processor 142 may generate a frequency control signal $V_{FREQ}$ that may set an operating frequency $f_{OP}$ of the LED drive circuit 130. In response to the frequency control signal $V_{FREQ}$, the latch circuit 160 may control the drive signal $V_{DR}$ to render the switching transistor of the LED drive circuit 130 conductive to start a cycle of the LED drive circuit, at which time the LED drive circuit may begin to conduct an inductor current $I_L$ conducted through an inductor (not shown) of the LED drive circuit 130. The analog control loop circuit 150 may generate a peak current threshold $V_{TH-PK}$, which may be used by the latch circuit 160 to render the switching transistor of the LED drive circuit 130 non-conductive in response to the magnitude of the inductor current $I_L$.

The LED driver 100 may comprise an amplifier circuit 170, which may receive a current feedback signal $V_{I-FB}$ from the LED drive circuit 130. The amplifier circuit 170 may amplify the current feedback signal $V_{I-FB}$ to generate an instantaneous current feedback signal $V_{I-INST}$, which may indicate an instantaneous magnitude of the inductor current $I_L$ flowing through the inductor of the LED drive circuit 130.

The LED driver 100 may further comprise a filter circuit 180, such as a boxcar filter circuit. The filter circuit 180 may receive the instantaneous current feedback signal $V_{I-INST}$ and generate a filtered feedback signal, e.g., an average current feedback signal $V_{I-AVE}$, which may indicate an average magnitude of the inductor current $I_L$ flowing through the inductor of the LED drive circuit 130 (e.g., over a specific time window). The processor 142 may generate a filter control signal $V_{FILTER}$ (e.g., a filter control signal) for controlling the operation of the filter circuit 180, e.g., to control when the filter circuit 180 filters the instantaneous current feedback signal $V_{I-INST}$. For example, the processor 142 may control the filter control signal $V_{FILTER}$ to allow the filter circuit 180 to filter the instantaneous current feedback signal $V_{I-INST}$ over a filter window period $T_{FILTER}$ during each cycle of the LED drive circuit 130. The processor 142 may control the filter control signal $V_{FILTER}$ in a manner that is synchronous with the frequency control signal $V_{FREQ}$, e.g., to start a cycle of the LED drive circuit 130 at the beginning of the filter window period $T_{FILTER}$. For example, the filter window period $T_{FILTER}$ may have the same length during each cycle of the LED drive circuit 130 independent of the frequency of the frequency control signal $V_{FREQ}$. The magnitude of the average current feedback signal $V_{I-AVE}$ may indicate the average magnitude of the inductor current $I_L$ during the filter window period $T_{FILTER}$ (e.g., while the filter circuit 180 is filtering the instantaneous current feedback signal $V_{I-INST}$).

The analog control loop circuit 150 of the control circuit 140 may receive the average current feedback signal $V_{I-AVE}$ and the latch circuit 160 may receive the instantaneous current feedback signal $V_{I-INST}$. The analog control loop circuit 150 may adjust the magnitude of the peak current threshold $V_{TH-PK}$ in response to the target-current control signal $V_{I-TRGT}$ and the average current feedback signal $V_{I-AVE}$. The latch circuit 160 may control the drive signal $V_{DR}$ to render the switching transistor of the LED drive circuit 130 conductive in response to the frequency control signal $V_{FREQ}$ (e.g., at the beginning of a cycle of the LED drive circuit 130). The latch circuit 160 may control the drive signal $V_{DR}$ to render the switching transistor non-conductive in response to the peak current threshold $V_{TH-PK}$ and the instantaneous current feedback signal $V_{I-INST}$. After rendering the switching transistor of the LED drive circuit 130 non-conductive, the latch circuit 160 may remain in a latched state and maintain the switching transistor non-conductive until the beginning of the next cycle of the LED drive circuit 130.

The control circuit 140 may be configured to determine or learn (e.g., measure or receive an indication of) one or more operational characteristics of the LED light source 102 (e.g., learned load characteristics). For example, the control circuit 140 may be configured to determine a voltage representative of the magnitude of the load voltage $V_{LOAD}$. The magnitude of the load voltage $V_{LOAD}$ generated across the LED light source 102 may be dependent upon the magnitude of the load current $I_{LOAD}$ (e.g., the target load current $I_{TRGT}$ to which the control circuit 140 is regulating the load current $I_{LOAD}$) as well as the internal circuitry of the LED light source. The control circuit 140 may be configured to determine (e.g., measure) the magnitude of the load voltage $V_{LOAD}$ and/or store the measurement in the memory 112 as a learned load voltage $V_{LEARNED}$. The control circuit 140 may be configured to determine (e.g., measure) the magnitude of the load voltage $V_{LOAD}$ using a load voltage feedback signal $V_{V-LOAD}$ received from the LED drive circuit 130. For example, the LED drive circuit 130 may comprise a resistive divider circuit (not shown) coupled across the LED light source 102 for generating the load voltage feedback signal $V_{V-LOAD}$ as a scaled load voltage. The load voltage feedback signal $V_{V-LOAD}$ may be received by an analog-to-digital converter (ADC) of the processor 142 for learning the magnitude of the load voltage $V_{LOAD}$.

The control circuit 140 may be configured to determine (e.g., measure) the magnitude of the load voltage $V_{LOAD}$ when the target intensity $L_{TRGT}$ is at or near the low-end intensity $L_{LE}$. For example, the control circuit 140 may be configured to determine (e.g., measure) the magnitude of the load voltage $V_{LOAD}$ while the control circuit 140 is fading the LED light source 102 from on to off, for example, while the average magnitude of the load current $I_{LOAD}$ is within a measurement window that may range from a maximum learning threshold $I_{LEARN-MAX}$ to a minimum learning threshold $I_{LEARN-MIN}$. The maximum learning threshold $I_{LEARN-MAX}$ and the minimum learning threshold $I_{LEARN-MIN}$ may be functions of a rated (or maximum) current $I_{RATED}$ of the LED light source 102, for example, $0.0020 \cdot I_{RATED}$ and $0.0002 \cdot I_{RATED}$, respectively.

The control circuit 140 may be configured to control the LED drive circuit 130 using the learned load voltage $V_{LEARNED}$. For example, the control circuit 140 may be configured to control the LED drive circuit 130 in response to the learned load voltage $V_{LEARNED}$ when turning on the LED light source 102. The control circuit 140 may be configured to charge (e.g., "pre-charge") an output capacitor (not shown) of the LED drive circuit 130 prior to attempting to turn on the LED light source 102. In response to receiving a command to turn on the LED light source 102 and/or in response to power being applied to the LED driver 100 to turn on the LED light source, the control circuit 140 may pre-charge the output capacitor until the magnitude of the load voltage $V_{LOAD}$ reaches or exceeds a pre-charge voltage threshold $V_{TH-PC}$, which may be, for example, a function of the learned load voltage $V_{LEARNED}$ (e.g., as will be described in greater detail below). The pre-charging of the output capacitor may allow the LED driver 100 to turn-on the LED light source 102 quickly and consistently, e.g., when fading on to the low-end intensity $L_{LE}$.

The control circuit 140 may be configured to determine an operating parameter (e.g., a pre-load parameter) as a function of the learned load voltage $V_{LEARNED}$ and use the operating parameter to control the LED drive circuit 130 to pre-charge the output capacitor of the LED drive circuit 130 prior to turning the LED light source 102 on (e.g., as will be described in greater detail below). For example, the control circuit 140 may be configured to determine the DC magnitude or the duty cycle of the target-current control signal $V_{I-TRGT}$ to use while pre-charging the output capacitor of the LED drive circuit 130 as a function of the learned load voltage $V_{LEARNED}$. In addition, the processor 142 may generate a start-up control signal $V_{START-UP}$ for controlling the analog control loop circuit 150 while pre-charging the output capacitor of the LED drive circuit 130 to maintain the output of the analog control loop circuit 150 at a predetermined voltage.

After the magnitude of the load voltage $V_{LOAD}$ reaches or exceeds the pre-charge voltage threshold $V_{TH-PC}$, the processor 142 may control the start-up control signal $V_{START-UP}$ to allow the analog control loop circuit 150 to control the LED drive circuit 130 using closed loop control in response to the current feedback signal $V_{I-FB}$ to regulate the magnitude of the load current $I_{LOAD}$ towards the target current $I_{TRGT}$.

Figure 2:
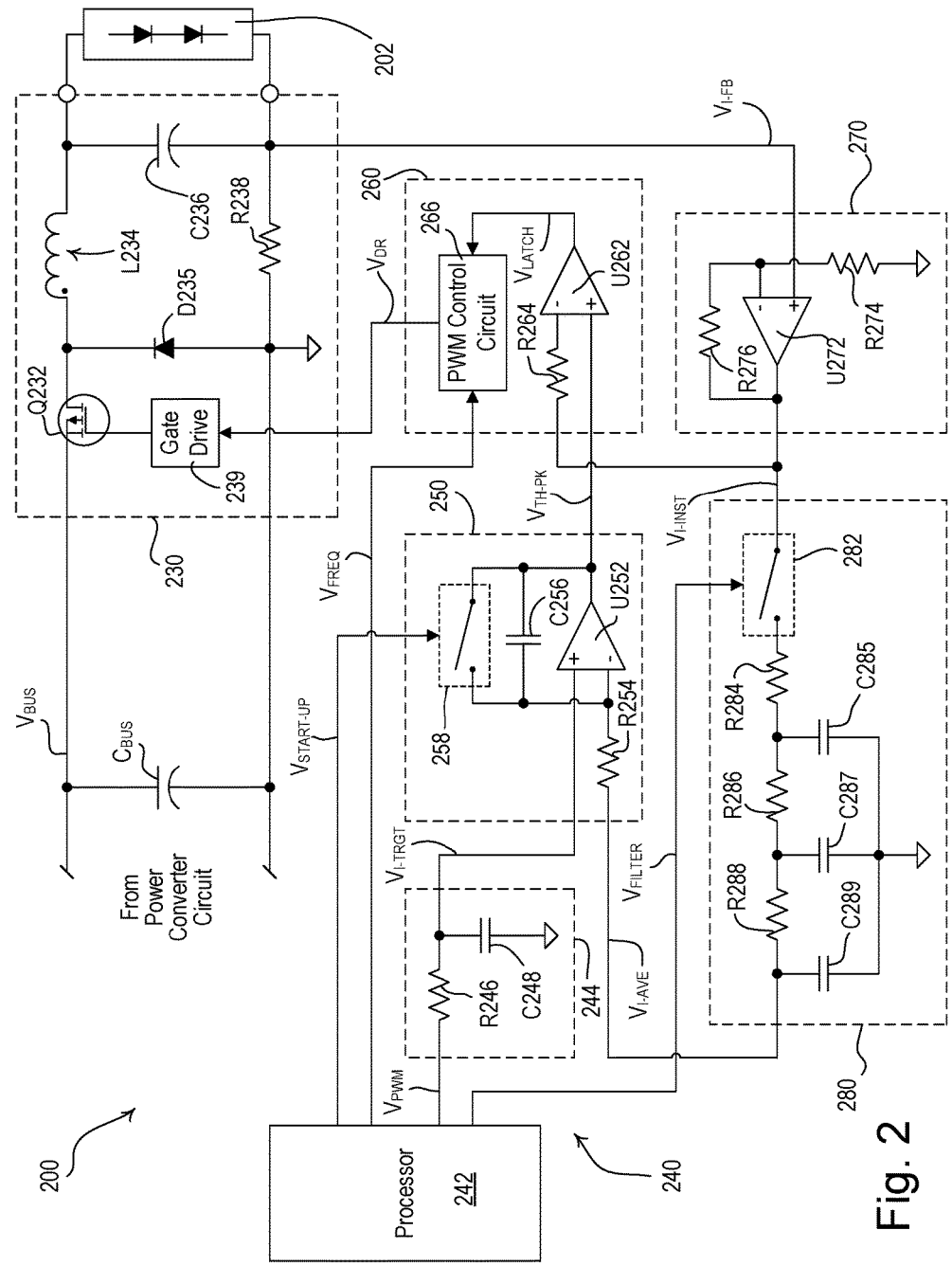
FIG. 2 is a simplified schematic diagram of an example LED driver.

FIG. 2 is a simplified schematic diagram of a load regulation device, e.g., an LED driver 200 (such as the LED driver 100 of FIG. 1) for controlling the intensity of an LED light source 202. The LED driver 200 may comprise a bus capacitor $C_{BUS}$ for storing a bus voltage $V_{BUS}$, which may be generated by a power converter circuit (e.g., the power converter circuit 120 of the LED driver 100). The LED driver 200 may comprise an LED drive circuit 230, which may be configured to control the magnitude of a load current $I_{LOAD}$ conducted through the LED light source 202. The LED driver 200 may further comprise a control circuit 240, which may be a hybrid analog-digital control circuit (e.g., the control circuit 140 of the LED driver 100). The control circuit 240 may comprise a processor 242, a low-pass filter circuit 244, an analog control loop circuit 250 (e.g., which may include an integrator circuit 250), and a latch circuit 260. The latch circuit 260 may generate a drive signal $V_{DR}$, which may be provided to the LED driver circuit 230. The LED driver 200 may further comprise an amplifier circuit 270 and a filter circuit 280 (e.g., a boxcar filter circuit) for generating an instantaneous current feedback signal $V_{I-INST}$ and an average current feedback signal $V_{I-AVE}$, respectively.

As shown in FIG. 2, the LED drive circuit 230 may comprise a buck converter. The LED drive circuit 230 may comprise a switching transistor, e.g., a field-effect transistor (FET) Q232, which may be controlled in response to the drive signal $V_{DR}$ to control the average magnitude of the load current $I_{LOAD}$. The LED drive circuit 230 may also comprise an inductor L234, a switching diode D235, an output capacitor C236, and a feedback resistor 8238. The drive signal $V_{DR}$ may be coupled to a gate of the FET Q232 through a gate drive circuit 239. When the FET Q232 is conductive, the inductor L234 may conduct an inductor current $I_L$ from the bus capacitor $C_{BUS}$ through the parallel combination of the output capacitor C236 and the LED light source 202. When the FET Q232 is non-conductive, the inductor L234 may conduct the inductor current $I_L$ through the switching diode D235 and the parallel combination of the output capacitor C236, and the LED light source 202. The LED light source 202 may conduct the average component of the inductor current $I_L$ and the output capacitor C236 may conduct the transient component of the inductor current $I_L$. The average magnitude of the load current $I_{LOAD}$ may be approximately equal to the average magnitude of the inductor current $I_L$.

The current feedback signal $V_{I-FB}$ may be generated across the feedback resistor R238 of the LED drive circuit 230 and may be proportional to the magnitude of the inductor current $I_L$. The current feedback signal $V_{I-FB}$ may be received by the amplifier circuit 270. The amplifier circuit 270 may comprise an operational amplifier U272 and may be configured as a non-inverting amplifier circuit. The operational amplifier U272 may have a non-inverting input that may receive the current feedback signal $V_{I-FB}$. The amplifier circuit 270 may also comprise a resistor R274 coupled between an inverting input of the operational amplifier U272 and circuit common, and a resistor R276 coupled between the inverting input and an output of the operational amplifier U272. The amplifier circuit 270 may be configured to generate the instantaneous current feedback signal $V_{I-INST}$, which may be an amplified version of the current feedback signal $V_{I-FB}$ and may indicate the instantaneous magnitude of the inductor current $I_L$.

The filter circuit 280 may filter the instantaneous current feedback signal $V_{I-INST}$ to generate the average load current signal $V_{I-AVE}$, which may indicate the average magnitude of the inductor current $I_L$. The filter circuit 280 may comprise a controllable switching circuit 282 and a low-pass filter circuit (e.g., a third-order low-pass filter circuit) that includes resistors R284, R286, R288 and capacitors C285, C287, C289. The processor 242 may generate a filter control signal $V_{FILTER}$ for rendering the controllable switching circuit 282 conductive and non-conductive. When the controllable switching circuit 282 is conductive, the filter circuit 280 may be configured to filter the instantaneous current feedback signal $V_{I-INST}$ to generate the average current feedback signal $V_{I-AVE}$. When the controllable switching circuit 282 is non-conductive, the capacitors C285, C287, C289 of the filter circuit 280 may maintain the magnitude of the average current feedback signal $V_{I-AVE}$ at a value that indicates the average magnitude of the inductor current $I_L$ during the period of time when the controllable switching circuit 282 was previously conductive.

The processor 242 may generate a pulse-width modulated (PWM) signal $V_{PWM}$, which may be received by the low-pass filter circuit 244 of the control circuit 240. The low-pass filter circuit 244 may be configured to generate a target-current control signal $V_{I-TRGT}$, which may have a DC magnitude that indicates the target current $I_{TRGT}$. For example, the low-pass filter circuit 244 may comprise a resistor-capacitor (RC) circuit having a resistor R246 and a capacitor C248. The processor 242 may be configured to control the duty cycle of the pulse-width modulated signal $V_{PWM}$ to adjust the magnitude of the target-current control signal $V_{I-TRGT}$.

The average current feedback signal $V_{I-AVE}$ generated by the filter circuit 280 and the target-current control signal $V_{I-TRGT}$ generated by the low-pass filter circuit 244 may be received by the integrator circuit 250. The integrator circuit 250 may comprise an operational amplifier U252 having a non-inverting input coupled to the target-current control signal $V_{I-TRGT}$ and an inverting input coupled to the average current feedback signal $V_{I-AVE}$ via a resistor R254. The integrator circuit 250 may comprise a capacitor C256 coupled between the inverting input and an output of the operational amplifier U252, such that the integrator circuit 250 may be configured to integrate the error between the average current feedback signal $V_{I-AVE}$ and the target-current control signal $V_{I-TRGT}$. The integrator circuit 250 may generate a peak current threshold $V_{TH-PK}$ having a DC magnitude that may increase or decrease by amounts dependent upon the error between the magnitude of the target-current control signal $V_{I-TRGT}$ and the average current feedback signal $V_{I-AVE}$. The integrator circuit 250 may comprise a controllable switching circuit 258 coupled in parallel with the capacitor C256. The controllable switching circuit 258 may be rendered conductive and non-conductive in response to a startup control signal $V_{START-UP}$ received from the processor 242 during a startup routine (e.g., as will be described in greater detail below).

The latch circuit 260 may receive the peak current threshold $V_{TH-PK}$ generated by the integrator circuit 250 and the instantaneous current feedback signal $V_{I-INST}$ generated by the amplifier circuit 270. The latch circuit 260 may comprise a comparator U262 configured to compare the magnitude of the instantaneous current feedback signal $V_{I-INST}$ to the magnitude of the peak current threshold $V_{TH}$. The comparator U262 may generate a latch control signal $V_{LATCH}$ at an output. When the magnitude of the instantaneous current feedback signal $V_{I-INST}$ is less than the magnitude of the peak current threshold $V_{TH}$, the comparator U262 may drive the latch control signal $V_{LATCH}$ at the output high (e.g., towards the supply voltage $V_{CC}$). When the magnitude of the instantaneous current feedback signal $V_{I-INST}$ exceeds the magnitude of the peak current threshold $V_{TH-PK}$, the comparator U262 may drive the latch control signal $V_{LATCH}$ at the output low (e.g., towards circuit common).

The processor 242 may generate a frequency control signal $V_{FREQ}$ that may set an operating frequency $f_{OP}$ of the LED drive circuit 230. The latch circuit 260 may comprise a PWM control circuit 266, which may receive the latch control signal $V_{LATCH}$ from the comparator U262 and the frequency control signal $V_{FREQ}$ from the processor 242. The PWM control circuit 266 may generate the drive signal $V_{DR}$, which may be received by the gate drive circuit 239 of the LED drive circuit 230. When the frequency control signal $V_{FREQ}$ is driven high at the beginning of a cycle of the LED driver circuit 230, the PWM control circuit 266 may drive the magnitude of the drive signal $V_{DR}$ high, which may render the FET Q232 of the LED drive circuit 230 conductive. When the magnitude of the instantaneous current feedback signal $V_{I-INST}$ exceeds the magnitude of the peak current threshold signal $V_{TH}$, the comparator U262 may drive the latch control signal $V_{LATCH}$ low, which may cause the PWM control circuit 266 to drive the magnitude of the drive signal $V_{DR}$ low. The PWM control circuit 266 may maintain the magnitude of the drive signal $V_{DR}$ low until the processor 242 drives the magnitude of the frequency control signal $V_{FREQ}$ high once again at the end of the present cycle and the beginning of the next cycle of the LED drive circuit 230.

Figure 3A:
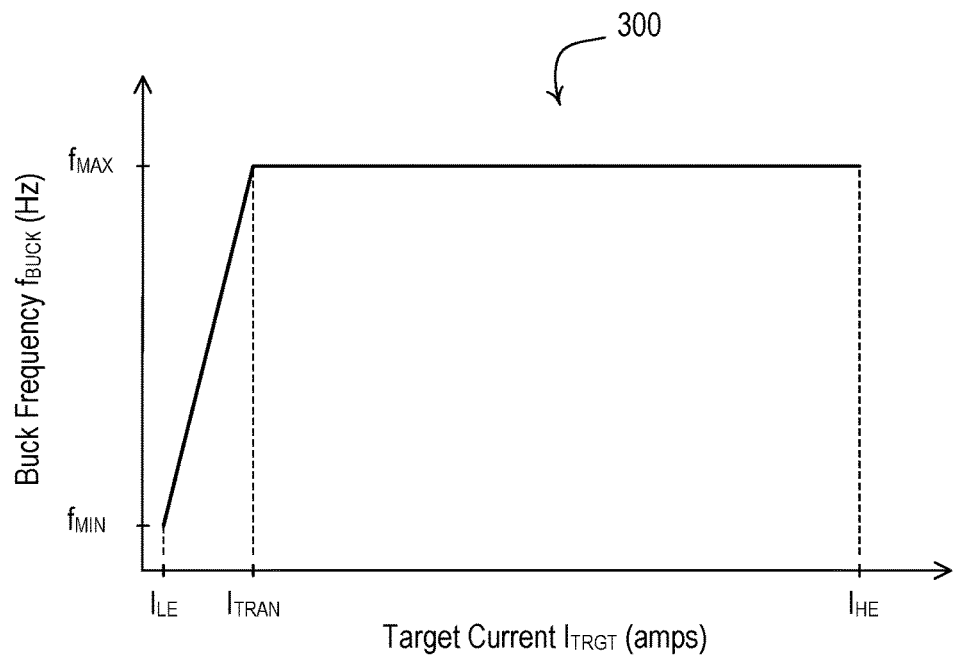
FIG. 3A is an example plot of a relationship between an operating frequency and a target current of the LED driver of FIG. 2.
Figure 3B:
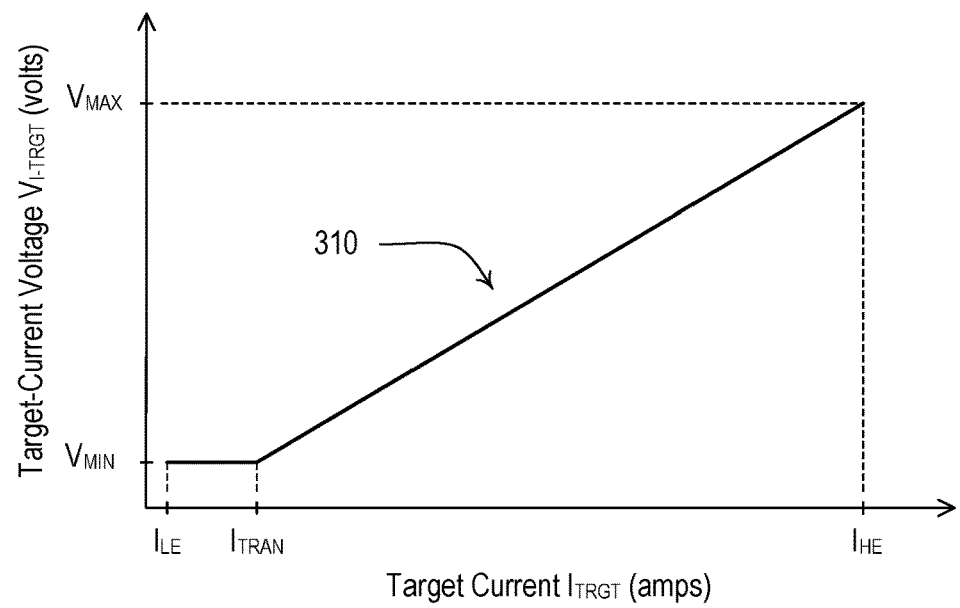
FIG. 3B is an example plot of a relationship between a magnitude of a target-current control signal and the target current of the LED driver of FIG. 2.

The processor 242 may control the frequency of the frequency control signal $V_{FREQ}$ and the duty cycle of the pulse-width modulated control signal $V_{PWM}$ (and thus the magnitude of the target-current control signal $V_{I-TRGT}$) in dependence upon the target current $I_{TRGT}$ of the LED light source 202 using open loop control. FIG. 3A is an example plot of the relationship 300 between the frequency of the frequency control signal $V_{FREQ}$ (e.g., the operating frequency $f_{OP}$ of the LED drive circuit 230) and the target current $I_{TRGT}$. FIG. 3B is an example plot of the relationship 310 between the magnitude of the target-current control signal $V_{I-TRGT}$ and the target current $I_{TRGT}$. For example, the target current $I_{TRGT}$ may range between a high-end current $I_{HE}$ (e.g., approximately 150 mA) at the high-end intensity $L_{HE}$ and a low-end current $I_{LE}$ (e.g., approximately 150 μA) at the low-end intensity $L_{LE}$.

The processor 242 may operate in first and second modes of operation depending upon whether the target current $I_{TRGT}$ is less than or greater than approximately a transition current $I_{TRAN}$ (e.g., approximately 16.8 mA). Near the low-end intensity $L_{LE}$ (e.g., when the target current $I_{TRGT}$ is less than approximately the transition current $I_{TRAN}$), the processor 242 may operate in the first operating mode during which the processor 242 may adjust the frequency of the frequency control signal $V_{FREQ}$ between a minimum operating frequency $f_{MIN}$ and a maximum operating frequency $f_{MAX}$ (e.g., linearly) with respect to the target current $I_{TRGT}$ while holding the magnitude of the target-current control signal $V_{I-TRGT}$ constant (e.g., at a minimum voltage $V_{MIN}$). Near the high-end intensity $L_{HE}$ (e.g., when the target current $I_{TRGT}$ is greater than or equal to approximately the transition current $I_{TRAN}$), the processor 242 may operate in the second operating mode during which the processor 242 may adjust the magnitude of the target-current control signal $V_{I-TRGT}$ between the minimum voltage $V_{MIN}$ and a maximum voltage $V_{MAX}$ (e.g., linearly) with respect to the target current $I_{TRGT}$ while holding the frequency control signal $V_{FREQ}$ constant (e.g., at the maximum operating frequency $f_{MAX}$). For example, the maximum operating frequency $f_{MAX}$ may be approximately 140 kHz and the minimum operating frequency $f_{MIN}$ may be approximately 1250 Hz. For example, the maximum voltage $V_{MAX}$ may be approximately 3.3 V and the minimum voltage $V_{MIN}$ may be approximately 44 mV.

Figure 4A:
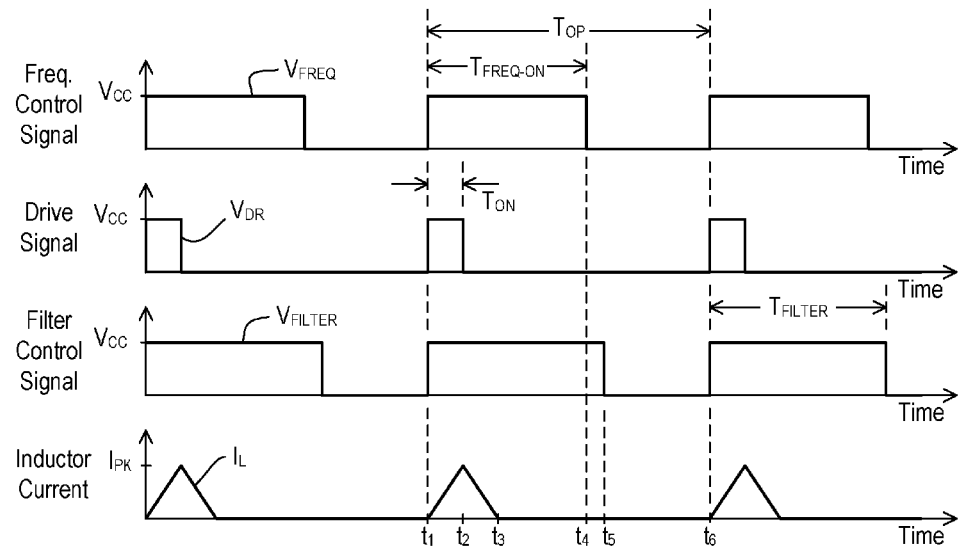
FIGS. 4A and 4B show example waveforms illustrating the operation of the LED driver of FIG. 2.
Figure 4B:
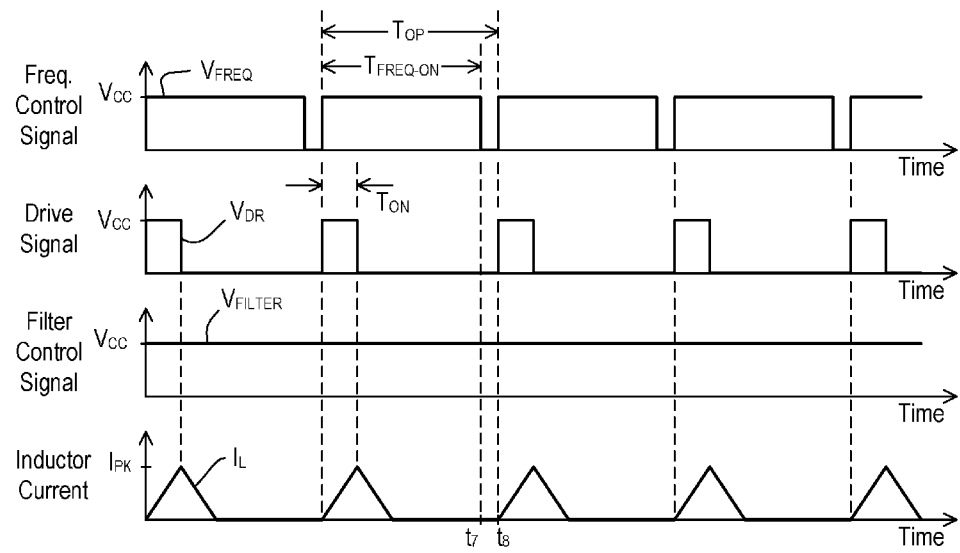

FIGS. 4A and 4B show example waveforms illustrating the operation of the LED driver 200 shown in FIG. 2. FIG. 4A shows example waveforms illustrating the operation of the LED driver 200 when the target current $I_{TRGT}$ is less than the transition current $I_{TRAN}$. The processor 242 may generate the frequency control signal $V_{FREQ}$ to set the operating frequency $f_{OP}$ of the LED drive circuit 230. For example, an operating period $T_{OP}$ of the LED drive circuit 230 may be equal to the period of the frequency control signal $V_{FREQ}$. The processor 242 may set the operating frequency $f_{OP}$ (and thus the operating period $T_{OP}$) in dependence upon the target current $I_{TRGT}$ (e.g., as shown in FIG. 3A). The processor 242 may generate the frequency control signal $V_{FREQ}$ to have a predetermined on-time $T_{FREQ\text{-}ON}$, which may have the same length each cycle of the LED drive circuit 130 (e.g., independent of the frequency of the frequency control signal $V_{FREQ}$ or the target current $I_{TRGT}$).

The processor 242 may generate the filter control signal $V_{FILTER}$ in a synchronous manner with respect to the frequency control signal $V_{FREQ}$. For example, the processor 242 may drive both the filter control signal $V_{FILTER}$ and the frequency control signal $V_{FREQ}$ high at the same time to start a cycle of the LED drive circuit 230 (e.g., at time $t_1$ in FIG. 4A). At time $t_1$, the PWM control circuit 266 of the latch circuit 260 may drive the magnitude of the drive signal $V_{DR}$ high (e.g., towards the supply voltage $V_{CC}$) causing the FET Q232 of the LED drive circuit 230 to be rendered conductive. At this time, the inductor L234 of the LED drive circuit 230 may begin to conduct the inductor current $I_L$. When the instantaneous current feedback signal $V_{I\text{-}INST}$ (which may be proportional to the magnitude of the inductor current $I_L$) exceeds the magnitude of the peak current threshold signal $V_{TH}$, the PWM control circuit 266 may drive the magnitude of the drive voltage $V_{DR}$ low (e.g., towards circuit common) as shown at time $t_2$ of FIG. 4A, which may cause the FET Q232 of the LED drive circuit 230 to be rendered non-conductive. The drive signal $V_{DR}$ may be characterized by an on-time $T_{ON}$ and a period that may be equal to the operating period $T_{OP}$ as shown in FIG. 4A. The PWM control circuit 266 may render the FET Q232 conductive for the length of the on-time $T_{ON}$ of the drive signal $V_{DR}$ during each operating cycle of the LED drive circuit 230. The inductor current $I_L$ may have a peak magnitude $I_{PK}$ as shown in FIG. 4A. The magnitude of the inductor current $I_L$ may begin to decrease at time $t_2$ until the magnitude of the inductor current $I_L$ drops to zero amps at time $t_3$.

The processor 242 may drive the frequency control signal $V_{FREQ}$ low at the end of the predetermined on-time $T_{FREQ\text{-}ON}$ (e.g., at time $t_4$ in FIG. 4A). The processor 242 may drive the filter control signal $V_{FILTER}$ low at the end of a filter window period $T_{FILTER}$ (e.g., at time $t_5$ in FIG. 4A). The processor 242 may drive both the filter control signal $V_{FILTER}$ and the frequency control signal $V_{FREQ}$ high to start another cycle of the LED drive circuit 230 at the end of the operating period $T_{OP}$ (e.g., at time $t_6$ in FIG. 4A).

When the target current $I_{TRGT}$ is less than the transition current $I_{TRAN}$, the processor 242 may hold the magnitude of the target-current control signal $V_{I\text{-}TRGT}$ constant at the minimum voltage $V_{MIN}$, and linearly adjust the frequency of the frequency control signal $V_{FREQ}$ between the minimum frequency $f_{MIN}$ and the maximum frequency $f_{MAX}$ as a function of the target current $I_{TRGT}$ (e.g., as shown in FIGS. 3A and 3B). The filter circuit 280 may be configured to filter the instantaneous current feedback signal $V_{I\text{-}INST}$ during the filter window period $T_{FILTER}$ each cycle of the LED drive circuit 230. When the target current $I_{TRGT}$ is less than the transition current $I_{TRAN}$, the filter control signal $V_{FILTER}$ may be a periodic signal characterized by the operating frequency $f_{OP}$. The processor 242 may maintain the length of the filter window period $T_{FILTER}$ of the filter control signal $V_{FILTER}$ constant from one cycle of the LED driver circuit 230 to the next cycle independent of the frequency of the frequency control signal $V_{FREQ}$. A duty cycle of the filter control signal $V_{FILTER}$ may vary as the frequency of the frequency control signal $V_{FREQ}$ is adjusted.

Since the target-current control signal $V_{I\text{-}TRGT}$ and the filter window period $T_{FILTER}$ are held constant, the on-time $T_{ON}$ of the drive signal $V_{DR}$ may be approximately the same each cycle of the LED drive circuit 230 even though the frequency of the drive signal $V_{DR}$ (e.g., the operating period $T_{OP}$) may vary in dependence upon the target current $I_{TRGT}$. As a result, the peak and average magnitudes of the inductor current $I_L$ during the filter window period $T_{FILTER}$ may be approximately the same from one cycle to the next of the LED drive circuit 230 independent of the target current $I_{TRGT}$ when the target current $I_{TRGT}$ is less than the transition current $I_{TRAN}$. The length of the filter window period $T_{FILTER}$ may be sized to ensure that the inductor current $I_L$ drops to zero amps before the end of the filter window period $T_{FILTER}$ when the target current $I_{TRGT}$ is less than the transition current $I_{TRAN}$. When the target current is less than the transition current $I_{TRAN}$, the LED drive circuit 230 may be configured to operate in a discontinuous mode of operation.

FIG. 4B shows example waveforms illustrating the operation of the LED driver 200 when the target current $I_{TRGT}$ is greater than the transition current $I_{TRAN}$. When the target current $I_{TRGT}$ is greater than the transition current $I_{TRAN}$, the processor 242 may linearly adjust the magnitude of the target-current control signal $V_{I\text{-}TRGT}$ between the minimum voltage $V_{MIN}$ and the maximum voltage $V_{MAX}$ as a function of the target current $I_{TRGT}$ (e.g., as shown in FIGS. 3A and 3B). In addition, the processor 242 may hold the frequency of the frequency control signal $V_{FREQ}$ constant at the maximum operating frequency $f_{MAX}$ (e.g., causing the operating period $T_{OP}$ to be held constant at a minimum operating period $T_{MIN}$). When the target current $I_{TRGT}$ is greater than the transition current $I_{TRAN}$, the processor 242 may control the duty cycle of the filter control signal $V_{FILTER}$ to a maximum filter duty cycle (e.g., 100%). For example, the operating period $T_{OP}$ may be equal to the length of the filter window period $T_{FILTER}$ when the target current $I_{TRGT}$ is greater than the transition current $I_{TRAN}$. As a result, the processor 242 may drive the filter control signal $V_{FILTER}$ high at all times (e.g., the filter control signal $V_{FILTER}$ is a constant signal) while the target current $I_{TRGT}$ is greater than the transition current $I_{TRAN}$ as shown in FIG. 4B. The average current feedback signal $V_{I\text{-}AVE}$ may indicate the average magnitude of the inductor current $I_L$ when the target current $I_{TRGT}$ is greater than the transition current $I_{TRAN}$. Additionally or alternatively, the processor 242 may drive the filter control signal $V_{FILTER}$ high approximately all of the time (e.g., almost all of the time), for example at substantially large duty cycle (e.g., approximately 90% or greater).

Because the processor 242 varies the magnitude of the target-current control signal $V_{I\text{-}TRGT}$ as a function of the target current $I_{TRGT}$, the length of the on-time $T_{ON}$ of the drive signal $V_{DR}$ may vary as a function of the target current $I_{TRGT}$ even though the frequency of the drive signal $V_{DR}$ (e.g., the operating period $T_{OP}$) is held constant. As the target current $I_{TRGT}$ increases, the peak current $I_{PK}$ of the inductor current may increase to a point at which the LED drive circuit 230 may begin to operate in a continuous mode of operation. Since the minimum operating period $T_{MIN}$ (e.g., the operating period $T_{OP}$ when the target current $I_{TRGT}$ is greater than the transition current $I_{TRAN}$) may be equal to the length of the filter window time period $T_{FILTER}$, the processor 242 may be configured to smoothly transition the LED driver 200 between the first operating mode when the target current $I_{TRGT}$ is less than the transition current $I_{TRAN}$ and the second operating mode when the target current $I_{TRGT}$ is greater than the transition current $I_{TRAN}$.

The length of the predetermined on-time $T_{FREQ\text{-}ON}$ of the frequency control signal $T_{FREQ}$ is less than the length of the operating period $T_{OP}$ when the target current $I_{TRGT}$ is greater than the transition current $I_{TRAN}$. The processor 242 may drive the frequency control signal $T_{FREQ}$ low (e.g., at time $t_7$ in FIG. 4B) and then high (e.g., at time $t_8$) at the end of each cycle of the LED drive circuit 230. This causes the PWM control circuit 266 of the latch circuit 260 to stop maintaining the magnitude of the drive signal $V_{DR}$ low, and to drive the magnitude of the drive signal $V_{DR}$ high again when the frequency control signal $T_{FREQ}$ is driven high to begin the next cycle of the LED drive circuit 230 (e.g., at time $t_8$).

The processor 242 of the control circuit 240 may be configured to determine or learn (e.g., measure or receive an indication of) the magnitude of the load voltage $V_{LOAD}$ and/or store the measurement in memory (e.g., the memory 112) as a learned load voltage $V_{LEARNED}$. The magnitude of the load voltage $V_{LOAD}$ generated across the LED light source 202 may be dependent upon the magnitude of the load current $I_{LOAD}$ (e.g., the target load current $I_{TRGT}$ to which the control circuit 240 is regulating the load current $I_{LOAD}$) as well as the internal circuitry of the LED light source. The processor 242 may be configured to receive a load voltage feedback signal from the LED drive circuit 230 (e.g., the load voltage feedback signal $V_{V-LOAD}$ of the LED driver 100), which may be a scaled version of the load voltage $V_{LOAD}$ generated by a resistive divider circuit (not shown) of the LED drive circuit 230. The processor 242 may sample the load voltage feedback signal using an analog-to-digital converter (ADC) to measure the magnitude of the load voltage $V_{LOAD}$.

FIG. 5A shows example waveforms illustrating the operation of the LED driver 200 when the processor 242 is learning the load voltage $V_{LOAD}$. The processor 242 may be configured to determine (e.g., measure) the magnitude of the load voltage $V_{LOAD}$ while the processor 242 is fading the LED light source 202 from on to off. As shown in FIG. 5A, when fading the LED light source 202 from on to off, the processor 242 may begin to decrease the average magnitude of the load current $I_{LOAD}$ from an initial current $I_{INIT}$ at time $t_0$, at which time the magnitude of the load voltage $V_{LOAD}$ may also begin to decrease, e.g., from an initial voltage $V_{INIT}$. The processor 242 may be configured to determine (e.g., measure) the magnitude of the load voltage $V_{LOAD}$ while the average magnitude of the load current $I_{LOAD}$ is within a measurement window that may range from a maximum learning threshold $I_{LEARN-MAX}$ and a minimum learning threshold $I_{LEARN-MIN}$ (e.g., between times $t_{WIN-START}$ and $t_{WIN-END}$ as shown in FIG. 5A). The maximum learning threshold $I_{LEARN-MAX}$ and the minimum learning threshold $I_{LEARN-MIN}$ may be functions of a rated (or maximum) current $I_{RATED}$ of the LED light source 202, for example, $0.0020 \cdot I_{RATED}$ and $0.0002 \cdot I_{RATED}$, respectively. The processor 242 may be configured to periodically sample the load voltage feedback signal during the measurement window, and to process the plurality of samples to determine the learned load voltage $V_{LEARNED}$. For example, the processor 242 may be configured to process the plurality of samples of the load voltage feedback signal by calculating an average or median value of the plurality of samples or filtering the samples using a digital low-pass filter.

The processor 242 may be configured to measure the load voltage $V_{LOAD}$ and determine the learned load voltage $V_{LEARNED}$ when (e.g., each time that) the processor 242 turns the LED light source 202 off (e.g., fades the LED light source off). The processor 242 may be configured to overwrite the learned load voltage $V_{LEARNED}$ stored in the memory with the learned load voltage $V_{LEARNED}$ determined the last time that the processor 242 turned off the LED light source 202. In addition, the processor 242 may be configured to process the learned load voltages $V_{LEARNED}$ from multiple turn-off events (e.g., calculate the average or median value of the multiple learned load voltages) before overwriting the learned load voltage $V_{LEARNED}$ stored in the memory.

The processor 242 may be configured to control the LED drive circuit 230 using the learned load voltage $V_{LEARNED}$, for example, when turning on the LED light source 202. FIG. 5B shows example waveforms illustrating the operation of the LED driver 200 when the processor 242 is fading on the LED light source 202 (e.g., fading on to a target intensity $L_{TRGT}$ that corresponds to a target current $I_{TRGT}$). In response to receiving a command to turn on the LED light source 202 and/or in response to power being applied to the LED driver 200 to turn on the LED light source, the processor 242 may be configured to pre-charge the output capacitor C236 of the LED drive circuit 230 during a pre-charge period $T_{PRE-CHARGE}$ prior to attempting to turn on the LED light source 202. During the pre-charge period $T_{PRE-CHARGE}$, the processor 242 may be configured to control the duty cycle of the pulse-width modulated signal $V_{PWM}$ (and thus the DC magnitude of the target-current control signal $V_{I-TRGT}$) as a function of the learned load voltage $V_{LEARNED}$ to cause the output capacitor C236 to charge faster than normal (e.g., faster than if the processor 242 controlled the DC magnitude of the target-current control signal $V_{I-TRGT}$ in response to the target current $I_{TRGT}$ as shown in FIG. 3B). The faster rate at which the output capacitor C236 charges during the pre-charge period $T_{PRE-CHARGE}$ may allow the processor 242 to turn-on the LED light source 202 quickly and consistently, e.g., when fading the LED light source on to the low-end intensity $L_{LE}$.

The control circuit 240 may be configured to pre-charge the output capacitor C236 of the LED drive circuit 230 until the magnitude of the load voltage $V_{LOAD}$ reaches or exceeds a pre-charge voltage threshold $V_{TH-PC}$. The pre-charge voltage threshold $V_{TH-PC}$ may be determined, for example, as a function of the learned load voltage $V_{LEARNED}$ (e.g., $V_{TH-PC} = \alpha \cdot V_{LEARNED}$, where $\alpha$ is a constant that may be, for example, approximately 0.90). Since the magnitude of the load voltage $V_{LOAD}$ may be greater when the LED light source 202 is cold than when the LED light source 202 is warm, the constant $\alpha$ may be sized to be less than one to ensure that the LED drive circuit 230 does not overshoot the learned load voltage $V_{LEARNED}$ when pre-charging the output capacitor C236. Additionally or alternatively, the pre-charge voltage threshold $V_{TH-PC}$ may be determined, for example, using a different function of the learned load voltage $V_{LEARNED}$ (e.g., $V_{TH-PC} = V_{LEARNED} - \beta$, where $\beta$ is a constant that may be, for example, approximately one volt). Additionally or alternatively, the pre-charge voltage threshold $V_{TH-PC}$ may be a fixed threshold (e.g., a predetermined threshold). The processor 242 may be configured to cease pre-charging the output capacitor C236 if the magnitude of the load voltage $V_{LOAD}$ does not exceed the pre-charge voltage threshold $V_{TH-PC}$ within a timeout period. The processor 242 may be configured to select the value of the duty cycle of the pulse-width modulated signal $V_{PWM}$ based on the learned load voltage $V_{LEARNED}$ such that pre-charge period $T_{PRE-CHARGE}$ for the LED driver 200 may be approximately the same for different LED light sources that have different resulting load voltages.

The processor 242 may control the start-up control signal $V_{START-UP}$ to render the controllable switching circuit 258 of the integrator circuit 250 conductive during the pre-charge period $T_{PRE-CHARGE}$. After the magnitude of the load voltage $V_{LOAD}$ reaches or exceeds the pre-charge voltage threshold $V_{TH-PC}$, the processor 242 may control the start-up control signal $V_{START-UP}$ to render the controllable switching circuit 258 of the integrator circuit 250 non-conductive. This may allow the integrator circuit 250 and the latch circuit 260 to control the LED drive circuit 230 using closed loop control in response to the current feedback signal $V_{I-FB}$ to regulate the magnitude of the load current $I_{LOAD}$ towards the target current $I_{TRGT}$.

Figure 6:
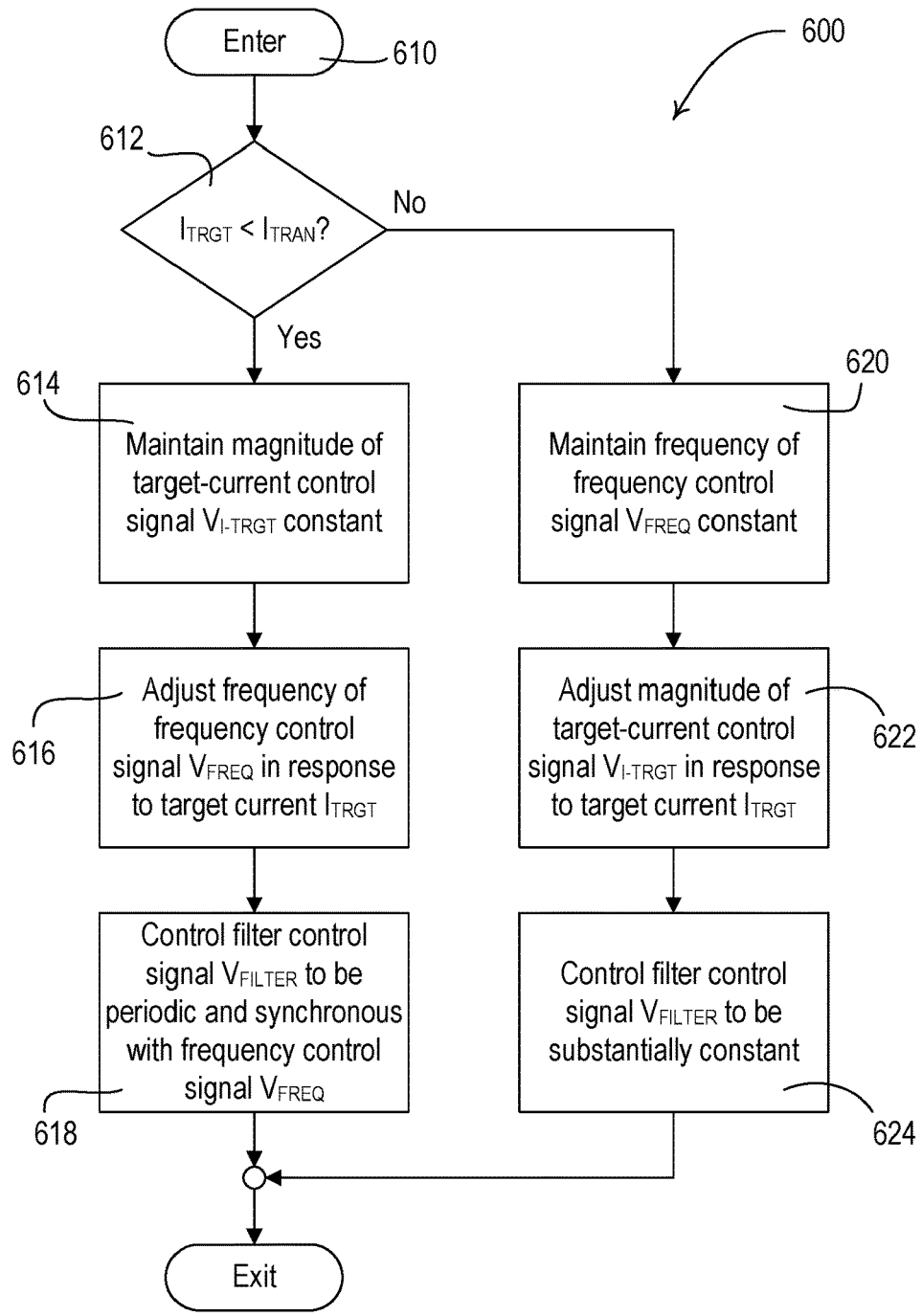
FIG. 6 is a simplified flowchart of an example control procedure for controlling an LED driver to control a magnitude of a load current conducted through a lighting load.

FIG. 6 is a simplified flowchart of an example control procedure 600 for controlling a load control device (e.g., the LED driver 200) to control a magnitude of a load current conducted through a lighting load (e.g., the LED light source 202). The control procedure 600 may be executed by a control circuit of the load control device (e.g., the control circuit 240 of the LED driver 200) at step 610, for example, periodically and/or in response to a change in the target current $I_{TRGT}$ for the lighting load. If the target current $I_{TRGT}$ is less than the transition current $I_{TRAN}$ at 612 (e.g., when the target intensity $L_{TRGT}$ in near the low-end intensity $L_{LE}$), the control circuit may maintain the magnitude of the target-current control signal $V_{I-TRGT}$ constant (e.g., at the minimum voltage $V_{MIN}$) at 614, and may adjust the frequency of the frequency control signal $V_{FREQ}$ in response to the target current $I_{TRGT}$ (e.g., as shown in FIG. 3A) at 616. The control circuit may then control a filter circuit (e.g., the filter circuit 280) at 618 by controlling the filter control signal $V_{FILTER}$ to be periodic (e.g., having the same frequency of the frequency control signal $V_{FREQ}$) and synchronized to the frequency control signal $V_{FREQ}$ (e.g., as shown in FIG. 4A). The control procedure 600 may then exit.

If the target current $I_{TRGT}$ is greater than the transition current $I_{TRAN}$ (e.g., greater than or equal to the transition current $I_{TRAN}$) at 612 (e.g., when the target intensity $L_{TRGT}$ in near the high-end intensity $L_{HE}$), the control circuit may maintain the frequency of the frequency control signal $V_{FREQ}$ constant (e.g., at the maximum operating frequency $f_{MAX}$) at 620, and may adjust the magnitude of the target-current control signal $V_{I-TRGT}$ in response to the target current $I_{TRGT}$ (e.g., as shown in FIG. 3B) at 622. The control circuit may then control the filter control signal $V_{FILTER}$ to be substantially constant at 624, before the control procedure 600 exits. For example, the control circuit may drive the control signal $V_{FILTER}$ using a maximum duty cycle, such as 100% (e.g., by constantly driving the filter control signal $V_{FILTER}$ high as shown in FIG. 4B), or a substantially high duty cycle (e.g., 90% or greater) at 624.

What is claimed is:

1. A load control device for controlling the intensity of a lighting load, the load control device comprising:
   a load regulation circuit configured to control the magnitude of a load current conducted through the lighting load to adjust the intensity of the lighting load between a low-end intensity and a high-end intensity, the load regulation circuit characterized by an operating frequency;
   a filter circuit configured to receive a current feedback signal from the load regulation circuit and to filter the current feedback signal to generate a filtered feedback signal; and
   a control circuit operatively coupled to the load regulation circuit for controlling the magnitude of the load current towards a target current in response to the filtered feedback signal;
   wherein the control circuit is configured to adjust the operating frequency of the load regulation circuit in response to the target current when the intensity of the lighting load is near the low-end intensity, the control circuit configured to control the filter circuit to filter the current feedback signal during a filter window that repeats on a periodic basis when the intensity of the lighting load is near the low-end intensity, the control circuit configured to control the filter circuit to constantly filter the current feedback signal when the intensity of the lighting load is near the high-end intensity.

2. The load control device of claim 1, wherein the control circuit is configured to adjust the operating frequency of the load regulation circuit in response to the target current when the magnitude of the target current is less than a transition current, the control circuit configured to control the filter circuit to filter the current feedback signal during the filter window when the magnitude of the target current is less than the transition current, the control circuit configured to control the filter circuit to constantly filter the current feedback signal when the magnitude of the target current is greater than the transition current.

3. The load control device of claim 2, wherein the load regulation circuit comprises a semiconductor switch and the control circuit is configured to render the semiconductor switch conductive for an on-time during each operating cycle of the load regulation circuit.

4. The load control device of claim 3, wherein, when the magnitude of the target current is greater than the transition current, the control circuit is configured to maintain the operating frequency of the load regulation circuit constant and adjust the on-time of the semiconductor switch of the load regulation circuit in response to the target current.

5. The load control device of claim 4, wherein the control circuit is configured to adjust a magnitude of a target-current control signal to adjust the on-time of the semiconductor switch of the load regulation circuit when the magnitude of the target current is greater than the transition current.

6. The load control device of claim 5, wherein, when the magnitude of the target current is less than the transition current, the control circuit is configured to maintain the magnitude of the target-current control signal constant and adjust the operating frequency of the load regulation circuit in response to the target current.

7. The load control device of claim 4, wherein the control circuit comprises a digital control circuit configured to generate a target-current control signal and an analog control loop circuit configured to control the semiconductor switch of the load regulation circuit to control the magnitude of the load current in response to the target-current control signal.

8. The load control device of claim 7, wherein, when the magnitude of the target current is less than the transition current, the control circuit is configured to maintain the magnitude of the target-current control signal constant and adjust the operating frequency of the load regulation circuit in response to the target current.

9. The load control device of claim 2, wherein the control circuit is configured to control the filter circuit with a periodic signal when the magnitude of the target current is less than the transition current, and with a constant signal when the magnitude of the target current is greater than the transition current.

10. The load control device of claim 9, wherein the control circuit is configured to generate a frequency control signal for controlling the operating frequency of the load regulation circuit.

11. The load control device of claim 10, wherein the periodic signal for controlling the filter circuit has a constant on-time.

12. The load control device of claim 11, wherein the periodic signal for controlling the filter circuit is synchronized with the frequency control signal.

13. The load control device of claim 12, wherein the on-time of the periodic signal for controlling the filter circuit is equal to a minimum period of the frequency control signal.

14. The load control device of claim 9, wherein the filter circuit comprises a boxcar filter circuit.

15. A load control device for controlling the intensity of a lighting load, the load control device comprising:
- a load regulation circuit configured to control the magnitude of a load current conducted through the lighting load to adjust the intensity of the lighting load;
- a filter circuit configured to receive a current feedback signal from the load regulation circuit and to filter the current feedback signal to generate a filtered feedback signal; and
- a control circuit operatively coupled to the load regulation circuit for controlling the magnitude of the load current towards a target current in response to the filtered feedback signal;
- wherein the control circuit is configured to adjust an operating frequency of the load regulation circuit in response to the target current when the magnitude of the target current of the lighting load is less than a transition current, the control circuit configured to control the filter circuit to filter the current feedback signal during a filter window that repeats on a periodic basis when the magnitude of the target current of the lighting load is less than the transition current, the control circuit configured to control the filter circuit to constantly filter the current feedback signal when the magnitude of the target current of the lighting load is greater than the transition current.

16. The load control device of claim 15, wherein the control circuit is configured to:
- render a semiconductor switch of the load regulation circuit conductive for an on-time during each operating cycle of the load regulation circuit;
- when the magnitude of the target current is greater than the transition current, maintain the operating frequency of the load regulation circuit constant and adjust the on-time of the semiconductor switch of the load regulation circuit in response to the target current; and
- when the magnitude of the target current is less than the transition current, adjust the operating frequency of the load regulation circuit in response to the target current.

17. The load control device of claim 15, wherein the control circuit is configured to control the filter circuit with a periodic signal when the magnitude of the target current is less than the transition current, and with a constant signal when the magnitude of the target current is greater than the transition current.

18. A load control device for controlling the intensity of a lighting load, the load control device comprising:
- a load regulation circuit configured to control the magnitude of a load current conducted through the lighting load to adjust the intensity of the lighting load between a low-end intensity and a high-end intensity;
- a filter circuit configured to receive a current feedback signal from the load regulation circuit and to filter the current feedback signal to generate a filtered feedback signal; and
- a control circuit operatively coupled to the load regulation circuit for controlling the magnitude of the load current towards a target current in response to the filtered feedback signal;
- wherein the control circuit is configured to adjust an operating frequency of the load regulation circuit in response to the target current when the magnitude of the target current is less than a transition current, the control circuit configured to generate a filter control signal for controlling the filter circuit to filter the current feedback signal during a filter window that repeats on a periodic basis when the magnitude of the target current is less than the transition current, the control circuit configured to control the filter control signal to have a maximum duty cycle when the magnitude of the target current is greater than the transition current.

19. The load control device of claim 18, wherein the filter control signal is a periodic signal when the target current is less than the transition current and a constant signal when the target current is greater than the transition current.

20. The load control device of claim 19, wherein the control circuit is configured to generate a frequency control signal for controlling the operating frequency of the load regulation circuit, the control circuit configured to control the periodic signal to have a constant on-time and to be synchronized with the frequency control signal.

21. The load control device of claim 20, wherein the maximum duty cycle is 100%.

22. The load control device of claim 20, wherein the maximum duty cycle is greater than approximately 90%.

* * * * *